United States Patent
Mescon et al.

(10) Patent No.: US 10,016,675 B2
(45) Date of Patent: Jul. 10, 2018

(54) SYSTEMS AND METHODS FOR USER-BASED ARBITRATION AND PEER REVIEW FOR ONLINE MULTIUSER SYSTEMS

(71) Applicant: RIOT GAMES, INC., Santa Monica, CA (US)

(72) Inventors: Steve Mescon, Los Angeles, CA (US); Christopher Burdick, Los Angeles, CA (US); Tom Cadwell, Los Angeles, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 129 days.

(21) Appl. No.: 14/808,394

(22) Filed: Jul. 24, 2015

(65) Prior Publication Data

US 2016/0166931 A1 Jun. 16, 2016

Related U.S. Application Data

(63) Continuation of application No. 13/424,670, filed on Mar. 20, 2012, now Pat. No. 9,120,019.

(51) Int. Cl.
*A63F 13/352* (2014.01)
*A63F 13/30* (2014.01)
*A63F 13/35* (2014.01)
*A63F 13/533* (2014.01)
*A63F 13/87* (2014.01)
(Continued)

(52) U.S. Cl.
CPC .......... *A63F 13/352* (2014.09); *A63F 13/12* (2013.01); *A63F 13/35* (2014.09); *A63F 13/533* (2014.09); *A63F 13/75* (2014.09); *A63F 13/798* (2014.09); *A63F 13/87* (2014.09)

(58) Field of Classification Search
USPC .......................................................... 463/42
See application file for complete search history.

(56) References Cited

U.S. PATENT DOCUMENTS

7,367,888 B1 * 5/2008 Chen ..................... A63F 13/12
463/1
7,584,154 B1 9/2009 Chen et al.
(Continued)

FOREIGN PATENT DOCUMENTS

KR  10-2004-0027249  4/2004
KR  10-2007-0117893  12/2007
KR  10-2010-0090858  8/2010

OTHER PUBLICATIONS

WO, PCT/US2013/032964 ISR, dated Jul. 23, 2013.

*Primary Examiner* — Tramar Harper
(74) *Attorney, Agent, or Firm* — ONE LLP; Joseph K. Liu

(57) ABSTRACT

The field of the invention relates to systems and methods for managing user behavior in online multiuser systems, and more particularly to systems and methods that provide user-based arbitration for online multiuser systems. In one embodiment, a multi-user online system enables a first user to report a second user's behavior while online. The system receives the report and merges the report with the second user's recorded interactions with the online system related to the report to create an arbitration file. The arbitration file is then made available to a third user to review the arbitration file and determine whether action is warranted.

10 Claims, 12 Drawing Sheets

Fig. 5b

(51) Int. Cl.
*A63F 13/75* (2014.01)
*A63F 13/798* (2014.01)

(56) References Cited

U.S. PATENT DOCUMENTS

| | | | | |
|---|---|---|---|---|
| 8,221,238 B1 * | 7/2012 | Shaw | | G07F 17/3225 |
| | | | | 463/29 |
| 8,366,553 B2 | 2/2013 | Kim et al. | | |
| 2003/0216962 A1 * | 11/2003 | Heller | | A63F 13/12 |
| | | | | 705/318 |
| 2004/0143852 A1 * | 7/2004 | Meyers | | A63F 13/12 |
| | | | | 725/133 |
| 2004/0242321 A1 * | 12/2004 | Overton | | G06F 21/128 |
| | | | | 463/29 |
| 2005/0043097 A1 * | 2/2005 | March | | A63F 13/12 |
| | | | | 463/42 |
| 2006/0003302 A1 * | 1/2006 | Fisher | | G09B 19/00 |
| | | | | 434/306 |
| 2006/0252547 A1 * | 11/2006 | Mizrahi | | A63F 13/10 |
| | | | | 463/42 |
| 2007/0087797 A1 * | 4/2007 | Van Luchene | | A63F 13/12 |
| | | | | 463/1 |
| 2007/0087799 A1 * | 4/2007 | Van Luchene | | A63F 13/822 |
| | | | | 463/1 |
| 2007/0244749 A1 * | 10/2007 | Speiser | | G06Q 30/0212 |
| | | | | 705/14.14 |
| 2008/0077517 A1 * | 3/2008 | Sappington | | G06Q 10/04 |
| | | | | 705/35 |
| 2009/0111583 A1 * | 4/2009 | Zalewski | | A63F 13/12 |
| | | | | 463/42 |
| 2009/0132689 A1 * | 5/2009 | Zaltzman | | G06Q 10/00 |
| | | | | 709/223 |
| 2009/0163278 A1 * | 6/2009 | Kawanaka | | A63F 13/12 |
| | | | | 463/40 |
| 2009/0170604 A1 * | 7/2009 | Mueller | | A63F 13/12 |
| | | | | 463/42 |
| 2011/0047007 A1 * | 2/2011 | Rule | | G06Q 10/107 |
| | | | | 705/7.39 |
| 2011/0047008 A1 * | 2/2011 | Rule | | G06Q 10/107 |
| | | | | 705/7.39 |
| 2011/0212767 A1 * | 9/2011 | Barclay | | G07F 17/32 |
| | | | | 463/25 |
| 2011/0221132 A1 * | 9/2011 | Kimbrough | | A63F 3/00 |
| | | | | 273/278 |
| 2012/0158852 A1 * | 6/2012 | Goldsmith | | G06Q 10/10 |
| | | | | 709/205 |
| 2013/0218691 A1 * | 8/2013 | Fargo | | G06Q 30/0217 |
| | | | | 705/14.73 |

* cited by examiner

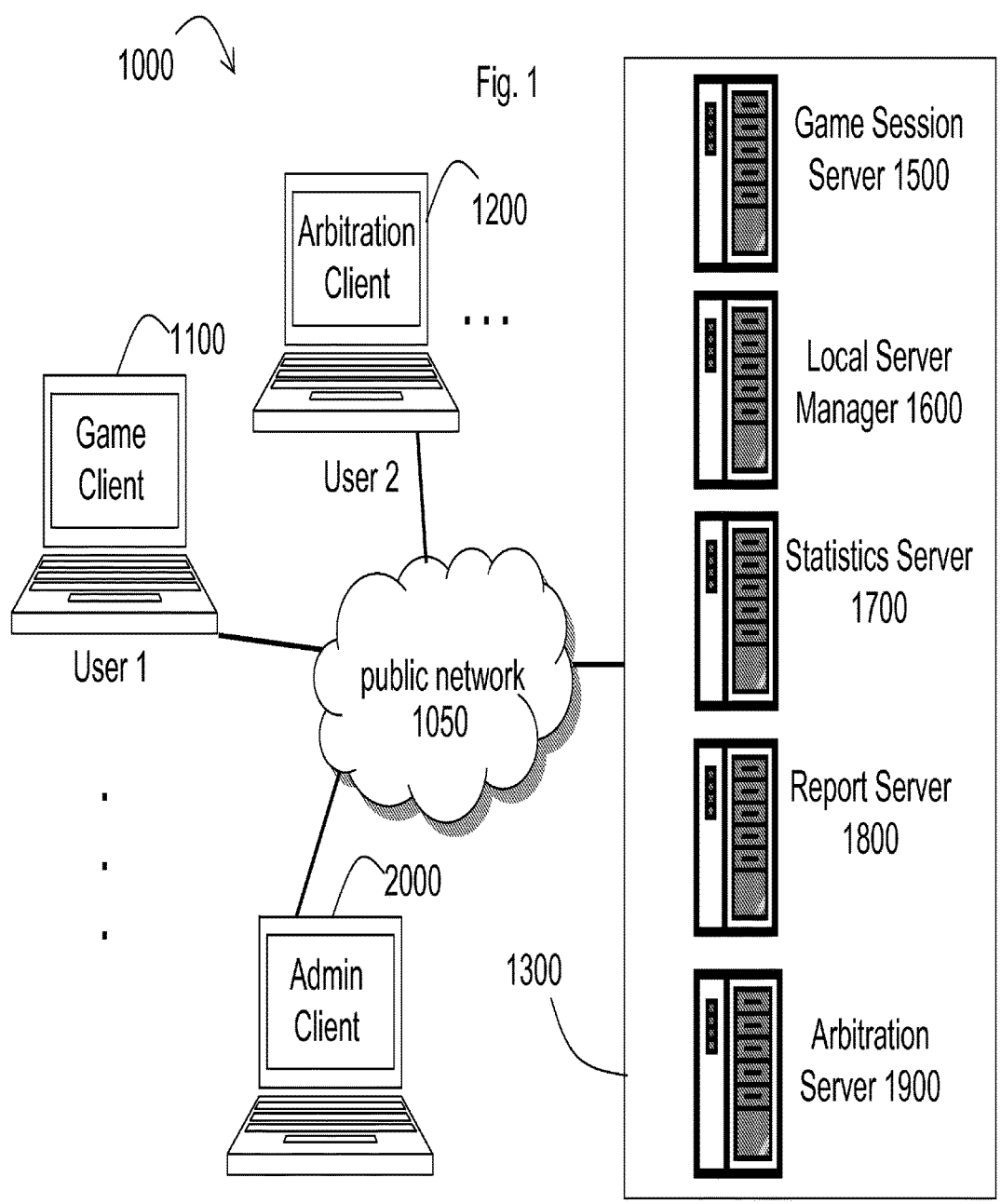

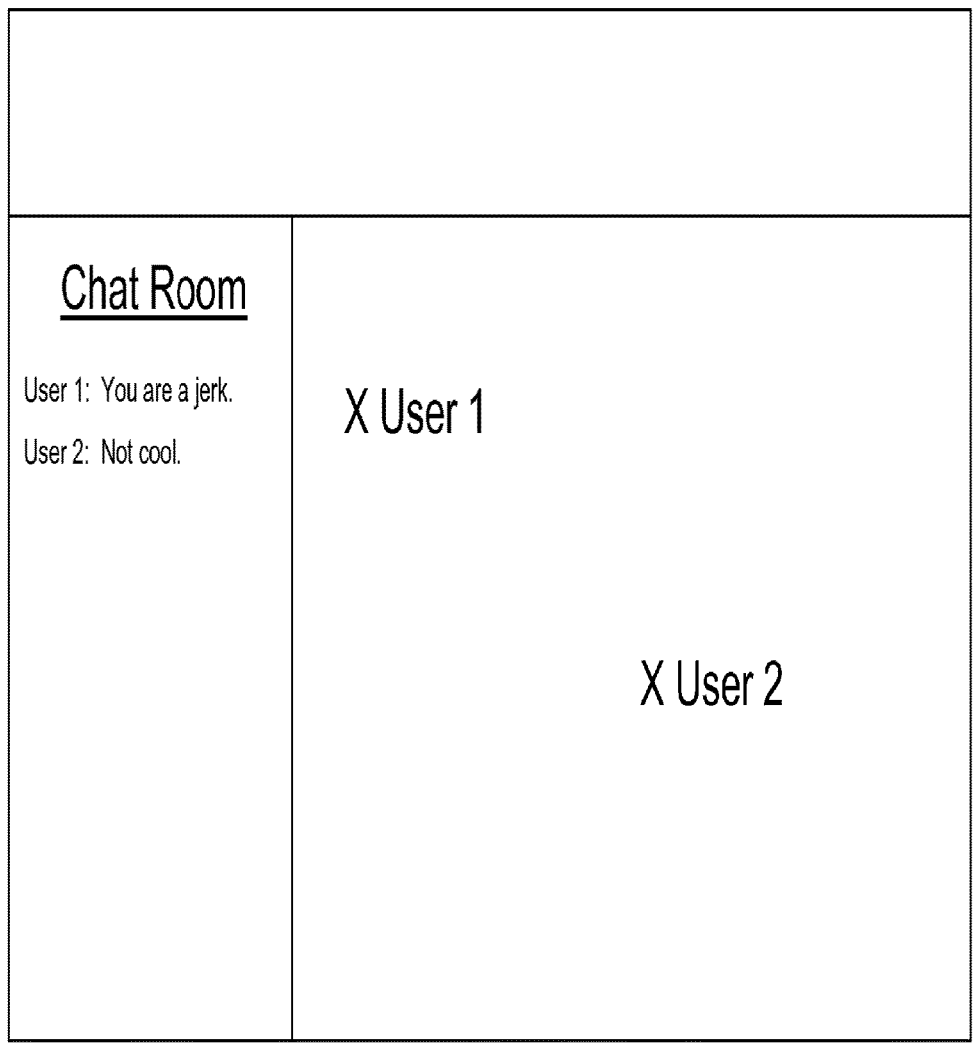

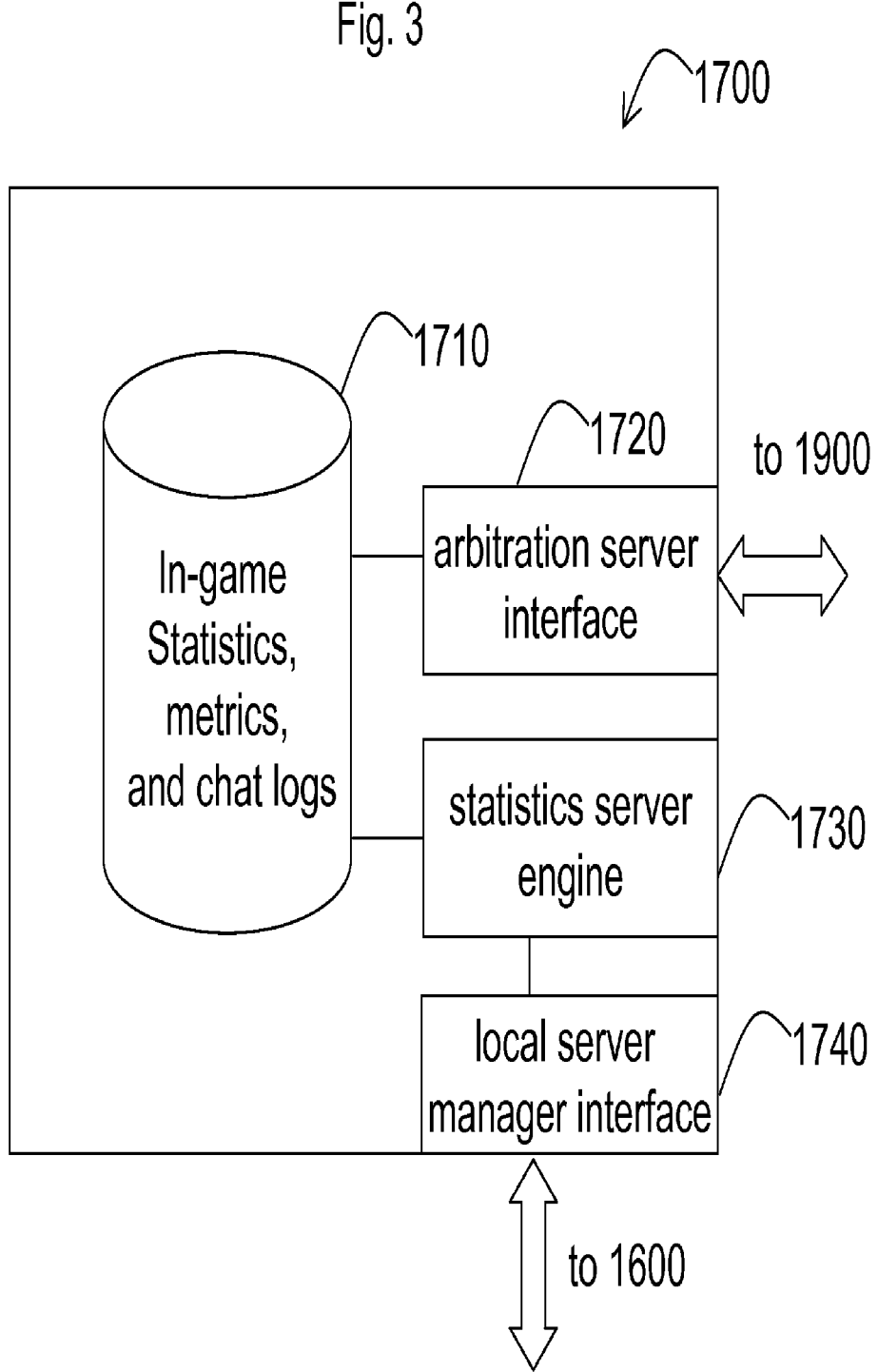

Report Player

Player(s) to be reported:  X User 1

Select Offense: | Harassment:  Offensive Language ▼ |

Add Comment:

Report Player

Player(s) to be reported:  X User 1

Select Exceptional Behavior: | Selfless Play ▼ |

Player rating (1-5 score): 4

Add Comment:

Fig. 5b   ↙ 1200

Case Review for User 1

Game Details:

Damage dealt:

Damage taken:

Report Details:

Reporting players: User 2 (Credibility grade: A)

Report reason: excessive time spend idle/verbal harassment

Time spend idle: 17 min. 18s

Report Comments:

User 2: User 1 was calling other player offensive names and was disruptive.

Chat Log from game:

User 2: You are a jerk!

User 1: Not cool

Punish (46)

Don't Punish (46)

Skip

Done for now

Time before next report: 30m

Fig. 5c  ↙ 1250

Case Review for User 1

Game Details:

Damage dealt:

Damage taken:

Report Details:

Reporting players: User 2 (<u>Credibility grade</u>: A)

Report reason: exceptionally friendly behavior

Report Comments:

User 2: User 1 was a fantastic player and very friendly and selfless

Chat Log from game:

User 1: Great Job, User 2

User 2: Thank you

- Reward (46)
- Don't Reward (46)
- Skip
- Done for now

Time before next report: 30m

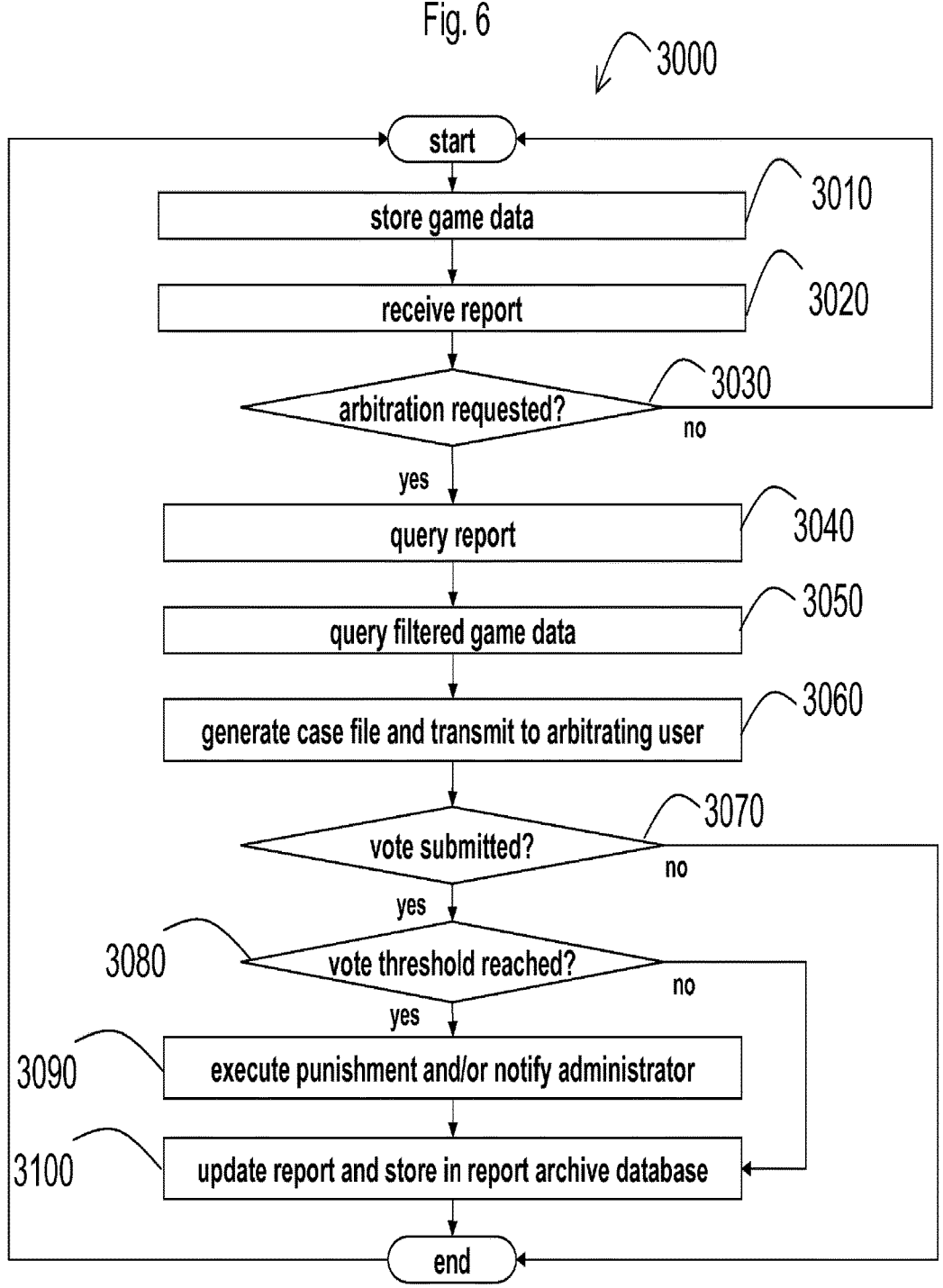

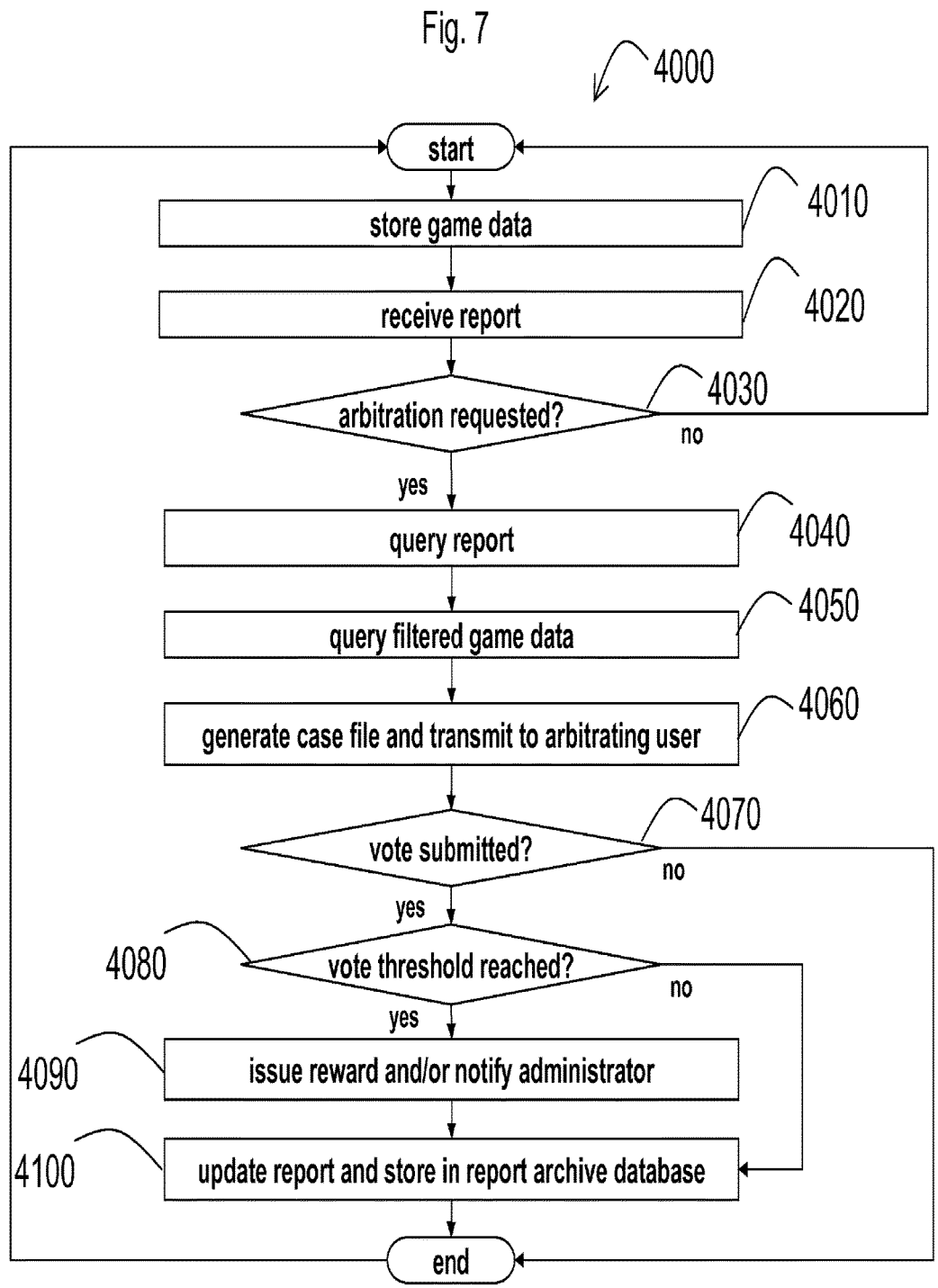

SYSTEMS AND METHODS FOR USER-BASED ARBITRATION AND PEER REVIEW FOR ONLINE MULTIUSER SYSTEMS

CROSS-REFERENCE TO RELATED APPLICATIONS

This application is a continuation of U.S. patent application Ser. No. 13/424,670, filed Mar. 20, 2012. The contents of this priority document and all other references disclosed herein are incorporated in their entirety for all purposes.

FIELD OF THE INVENTION

The field of the invention relates to systems and methods for managing user behavior in online multiuser systems, and more particularly to systems and methods that provide user-based arbitration to enable peer review for online multiuser systems.

BACKGROUND OF THE INVENTION

Controlling inappropriate behavior in public online multiuser systems is challenging, particularly when these systems have millions of user accounts, such as popular multiplayer online games, e.g., League of Legends from Riot Games (www.leagueoflegends.com). These games are generally low cost to participate in and users can register anonymously. Moreover, these games can be very competitive, thereby enabling aggressive and undesirable behavior, such as cheating or inappropriate communications or any unacceptable behavior as determined by a player's peers. For example, during a game, an aggressive user may send text messages to other users with profanity, insults, racial slurs, and/or threats of violence. In a system with millions of users, this behavior may by exhibited by hundreds or thousands of participants if unchecked, and having the game administrator police every user and/or incident is highly burdensome and expensive. Moreover, it may be desirable to reward positive behavior or exceptional skill in such systems. Accordingly, an improved system for encouraging and discouraging certain behavior and game play would be desirable.

SUMMARY OF THE INVENTION

The field of the invention relates to systems and methods for managing user behavior in online multiuser systems, and more particularly to systems and methods that provide user-based peer review for game play in online multiuser systems.

In one embodiment, a multi-user online system enables a first user to report one or more users' behavior, whether undesirable or exceptional, while interacting with the online system. The system receives the report and creates one or more arbitration files that merge the one or more reports with the one or more users' recorded interactions with the online system. The arbitration file is then made available to arbitrating users to review the one or more arbitration files and determine whether punishment and/or reward is warranted, thereby enabling crowd-sourced peer review.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1 is an exemplary diagram of a multiuser online game system in accordance with a preferred embodiment of the present invention;

FIG. 2b is an exemplary diagram of a game client user interface in accordance with a preferred embodiment of the present invention;

FIG. 3 is an exemplary diagram of a statistics server system in accordance with a preferred embodiment of the present invention;

FIG. 4b is an exemplary diagram of another game client user interface related to the report server system in accordance with a preferred embodiment of the present invention;

FIG. 4c is an exemplary diagram of another game client user interface related to the report server system in accordance with a preferred embodiment of the present invention;

FIG. 5b is an exemplary diagram of an arbitration client user interface related to the arbitration server system in accordance with a preferred embodiment of the present invention;

FIG. 5c is an exemplary diagram of another arbitration client user interface related to the arbitration server system in accordance with a preferred embodiment of the present invention; and FIG. 6 is an exemplary process in accordance with a preferred embodiment of the present invention.

FIG. 7 is another exemplary process in accordance with a preferred embodiment of the present invention.

DETAILED DESCRIPTION OF THE PREFERRED EMBODIMENTS

Preferred Systems

Turning to FIG. 1, a large multiuser online game system 1000 over a public network 1050, such as the Internet, is shown. An example of such a game system 1000 is League of Legends (www.leagueoflegends.com). League of Legends is a session-based, multiplayer online battle-arena game where rival teams compete against one another for victory on highly stylized battlefields and landscapes. Users can install a League of Legends game client on their personal computing device 1100 to establish a game session over the public network 1050 with the game system's 1000 datacenter 1300, which provides the online game interaction with the plurality of users 1100. The datacenter 1300 includes a plurality of server systems operating on a plurality of server machines communicatively coupled to each other via the public network 1050 and/or a secure virtual private network (not shown). The server machines each include a processor, memory, an operating system, an input/output interface and network interface all known in the art. In accordance with a preferred embodiment, the datacenter 1300 includes a game session server system 1500, a local server manager system 1600, a statistics server system 1700, a reporting server system 1800, and an arbitration server system 1800. Each of these server systems will be described in more detail below Game Session Server System 1500

Figure 2A:
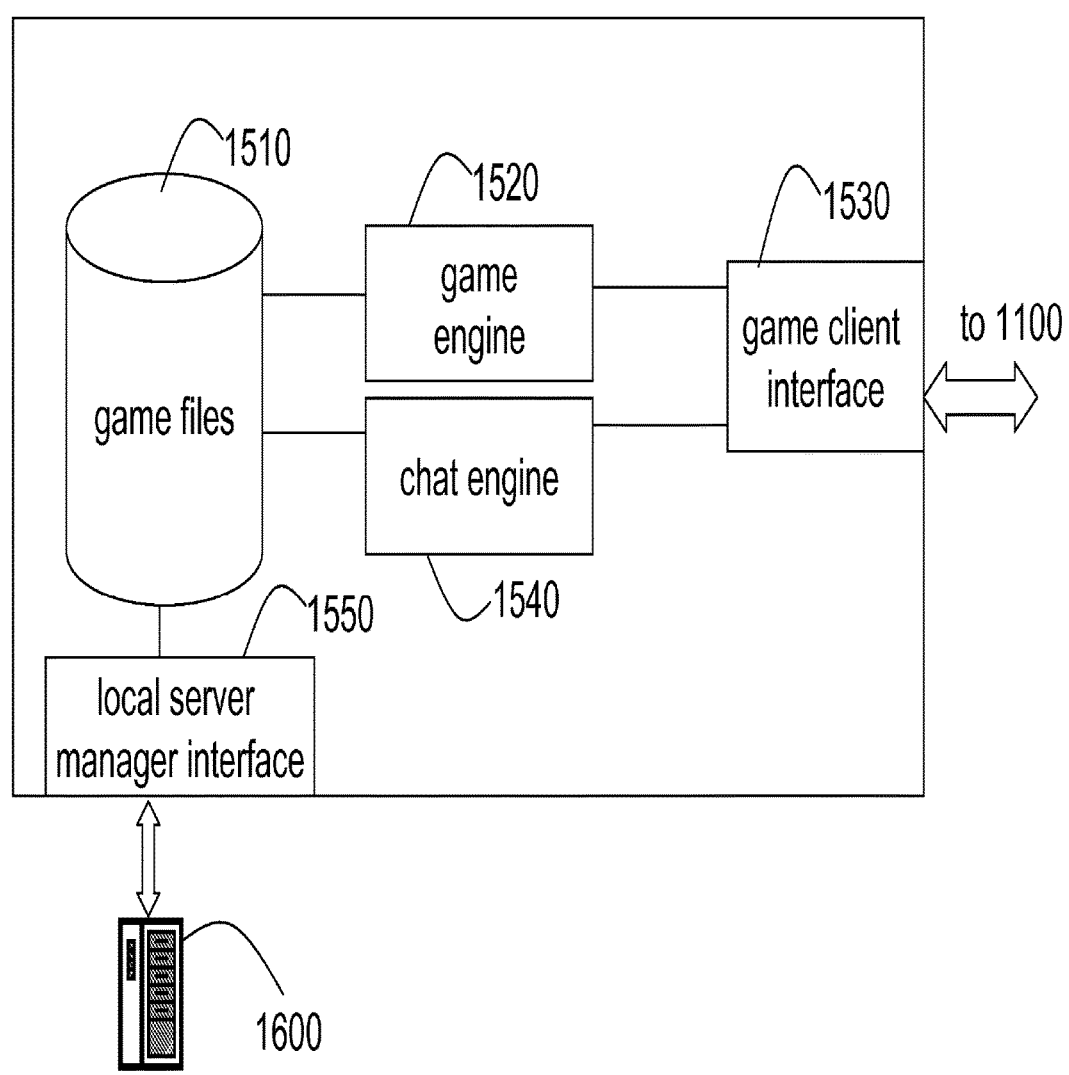
FIG. 2a is an exemplary diagram of a game session server system in accordance with a preferred embodiment of the present invention.

Turning to FIG. 2a, a more detailed diagram of a game session server system 1500 is shown. The game session server system 1500 provides the game interaction with the users' game client 1100 via the game client interface 1530, which is generally an application interface known in the art accessible over the public network 1050 by the game client 1100, e.g., in a traditional client server model. A game engine 1520 coupled to the game client interface 1530 is included to manage the interaction between the plurality of users 1100 and the game system 1000. The game session server system 1500 further includes a chat engine 1540 known in the art that enables the various users 1100 participating in a particular game session to communicate with each other via text messages. Audio, pictures, and multimedia may also be exchanged with the chat engine 1540. Both the game engine 1520 interactions as well as the chat messages exchanged can be recorded and stored in a game files database 1510. This enables, among other things, replay and history analysis by not only the users but also the administrator and other systems as will be described below. The game session server system 1500 further includes a local server manager interface 1550 for communications with the local server manager 1600.

Turning to FIG. 2b, an example game client 1100 user interface is shown. In online games such as League of Legends, each user is generally represented by a personalized graphical avatar in the user interface, (shown as "X" in this example), and the game client 1100 user interface may show the logical position of one user's avatar, X User 1, relative to another, X User 2. The game client 1100 user interface may also include a chat interface ("Chat Room") that enables participating users to communicate with one another, via chat engine 1540, beyond interactions with the avatars (Xs).

A game session server system 1500 generally includes physical servers distributed geographically in the same areas as its users. For example, users in the Southern California region may connect to a game session server system 1600 located in Los Angeles to initiate game sessions to ensure optimum performance.

Local Server Manager System 1600

The local server manager system 1600, also shown in FIG. 2a, also includes a plurality of distributed physical servers and controls the interactions with users' game clients 1100 before and after a game session. For example, users connect to a local server manager system 1600 to initiate game sessions via the game session server 1500. Upon the completion of a session-based game between multiple users, the game session server 1500 directs the users to their respective local server manager system 1600. Further, the local server manager system 1600 will query the data associated with that game from the game session server's game file database 1510 via the game session server's local server manager interface 1550.

Statistics Server System 1700

Turning to FIG. 3, a more detailed diagram of the statistics server system 1700 is shown. The statistics server system 1700 generally receives data from the game files database 1510 delivered by a local server manager 1600 via a local server manager interface 1740. The statistics server system 1700 includes a statistics server engine 1730 that receives the game files data from the local server manager 1600 and generates in-game statistics and metrics for storage in its own database 1710. The in-game statistics may include statistics for a particular player and/or a particular game, and may indicate a particular behavior pattern or skill level. For example, in League of Legends, where part of the game playing involves defeating other user avatars or computer controlled minions, statistics may include number of defeats over avatars, number of defeats over computer controlled minions, number of game play objectives completed, etc. . . . . . Such data can be generated and filtered by the statistics server engine 1730 and the results are stored in the statistics server database 1710. The statistics server engine 1730 further collects from the game files database 1510 the chat logs, which are also stored in the statistics server database 1710. The statistics server system 1700 further includes an arbitration server interface 1720, which is also generally an application interface known in the art for access by the arbitration server 1800.

Reporting Server System 1800

Figure 4A:
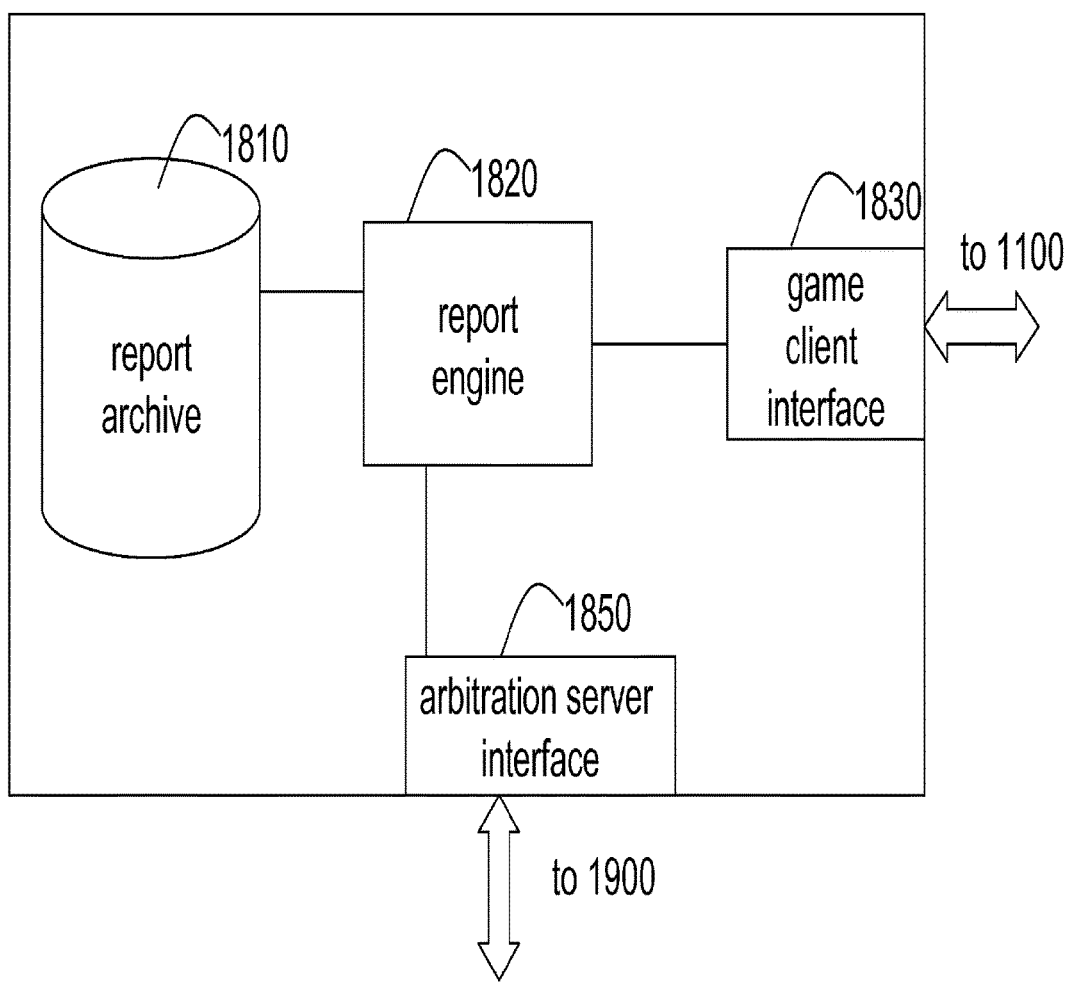
FIG. 4a is an exemplary diagram of a report server system in accordance with a preferred embodiment of the present invention.

Turning to FIG. 4a, a more detailed diagram of a report server system 1800 is shown. Because a large number of users can access and participate on the system 1000 anonymously, undesirable behavior may occur including any unacceptable behavior as determined by a player's peers. For example, one or more offending users in a game session may cheat or may send offensive chat messages, using profanity and/or racial slurs. On the other hand, certain users may exhibit exceptional skill and/or extraordinary behavior as determined by a player's peers. For example, a user may demonstrate exceptional game play or selfless-team oriented game play with encouraging and friendly communications. The game system 1000 provides a report server system 1800 that enables a second user to memorialize and report such behavior, whether desirable or undesirable, or skill to a third party, such as an administrator or other users.

In the case where a second user wishes to report undesirable behavior, the second user can use a reporting user interface included in the game client 1100, an example of which is shown in FIG. 4b. Upon completion of a game where the one or more offending users displayed undesirable behavior, the second user, with the user interface shown in FIG. 4b, may identify the one or more offending users, specify the undesirable behavior displayed, and add additional comments. The report server system 1800 receives the second user's one or more reports via the game client interface 1830, which is also generally an application interface such as that described above.

In the case where a second user wishes to report desirable and/or exceptional behavior or skill, the second user can use a reporting user interface 1150 included in the game client 1100, an example of which is shown in FIG. 4c. Upon completion of a game where the one or more exceptional users displayed desirable behavior or skill, the second user, with the user interface shown in FIG. 4c, may identify the one or more exceptional users, specify the behavior or skill displayed, add a rating, for example, a score from 1-5, and add additional comments. The report server system 1800 receives the second user's one or more reports via the game client interface 1830, which is also generally an application interface such as that described above.

The report server system 1800 includes a reporting engine 1820 component that is configured to receive reports submitted by users, via the game client interface 1830, and store them in a report archive database 1810, which can be a relational-type database, such as MySQL. Preferably, a coherence cache is used, which is a cache coupled to the database. The cache is in-memory, which enables faster querying of the database in real time, thereby improving scalability. From this report archive database 1810, not only can a specific report be derived, but also the identification of particular users that have been most frequently reported (e.g., top accused offenders or top rated players).

Moreover, in the case of undesirable behavior, one or more "harassment scores" may be derived based on the frequency and type of report received. Further, the timing of the reports submitted may also be stored. This can indicate whether reports have stopped for a particular accused offender, thereby indicating improved behavior. This can be a factor in an algorithm that assesses the "harassment score" for a particular user. Also provided is the identification of users that have most frequently submitted reports (i.e., "snitch score"). If a user has been reported by another user having a high snitch score, such data may be used to affect the harassment score as will be described in further detail below. In the case of exceptional behavior, a positive player rating may be established based on the frequency of positive reports. Moreover, if a positive report is from a user that indiscriminately submits positive reports for a large percentage of the game, such data may be used to affect player rating.

The report server system 1800 further includes an interface 1850 with the arbitration server system 1800, which is also generally an application interface known in the art.

Arbitration Server System 1900

Figure 5A:
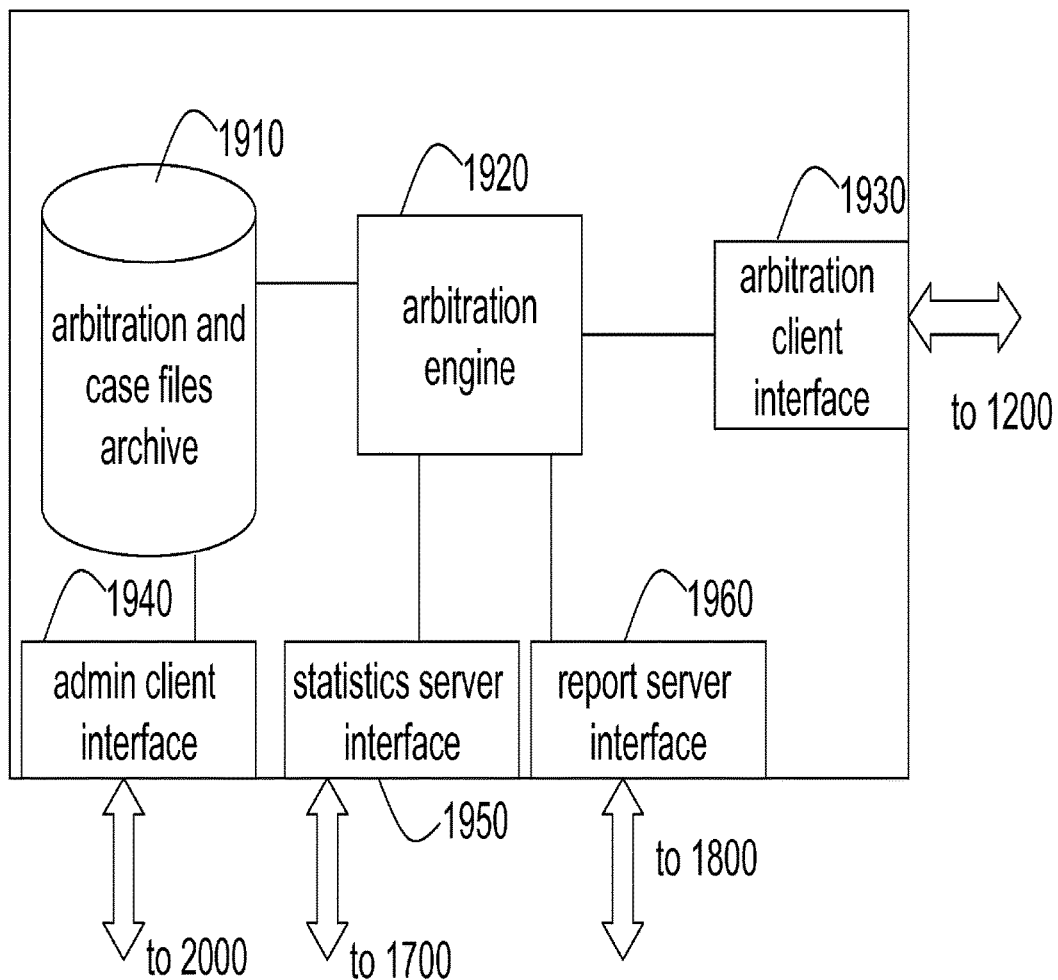
FIG. 5a is an exemplary diagram of an arbitration server system in accordance with a preferred embodiment of the present invention.

Turning to FIG. 5a, a more detailed diagram of an arbitration server system 1900 is shown. As mentioned above, it is a challenge to manage behavior in large multiuser online game systems. To address this issue, the game system 1000 in accordance with a preferred embodiment of the present invention generally provides for certain users of the game system 1000 to provide peer review of the merits of other users' reports submitted to the reporting server system 1800. To that end, the game system 1000 includes an arbitration server system 1900 having an arbitration engine 1920 that generates case files to be presented to a user that wishes to arbitrate a particular report. The arbitration engine 1920 queries a report from the reporting server system 1800, via a report server interface 1960 (also an application interface known in the art), and generates a case file that merges the queried report with data from the particular game at issue. This data is retrieved from the statistics server system 1700 via the statistics server interface 1950 using the identification of the particular game at issue. This case file is presented to the arbitrating client's 1200 user interface, such as that shown in FIGS. 5b and/or 5c.

In the case of arbitrating undesirable behavior, as shown in FIG. 5b, the arbitrating user's client 1200 is presented with "game details," e.g., the results of the game, such as damage dealt and damage taken. In the case of League of Legends, also included is performance score, "gold earned," and "healing done" as examples. The user interface 1200 also identifies "report details," such as the player(s) who submitted reports related to the game-at-issue, the alleged reason for the report submission(s), such as verbal harassment, and other related statistics relevant to the allegations. If the reporting user also submits comments, such comments will also be displayed as well as the actual communications between players, which is typically where many of the complaints result from. Moreover, a "credibility grade" or score, such as the snitch score described above, may be associated and displayed with the reporting user. For example, if the reporting user submits a report for a high percentage of the games played, e.g., over 50%, then a low credibility grade (or high snitch score) is provided, e.g., a "C." This may be stored and displayed in the reporting details for an arbitrating user to consider when voting. Moreover, the system 1000 may incorporate this statistic to reduce the "harassment score" for a particular offending user and/or punishment rendered.

From all of this data, the arbitrating user then has the option to either vote for punishment, vote for exoneration ("Don't Punish"), skip vote, or end arbitration ("Done for now"). Other options include more "soft" votes, e.g., the arbitrating user can also vote as to whether such behavior is simply unacceptable without rendering a punishment vote. Moreover, the arbitrating user can also vote as to type of punishment, e.g., whether to simply issue a warning, disable certain features, issue a temporary ban, or issue a permanent ban from the game system 1000. To prevent users from abusing the arbitration system, the arbitrating server 1900 can also specify the amount of time allotted in between case files for review ("Time before next report"). Also included are the voting statistics ("46"). After a user submits a vote, the results are stored in a case file database 1920, which can be a relational database such as MySQL. These results can then enable an administrator and system 1000 to verify the "harassment score" in the report server system 1800 and issue certain punishments for the particularly high offenders, such as issuing a warning or temporarily (or permanently) disabling offending users' access to the system 1000. In yet another alternative, for games that allow users to gain powers, weapons, and other features that can enable users to gain significant advantages over other users in the game, such powers, weapons, and other features can be disabled or reduced. The process for determining what punishment to issue can optionally include relevant voting statistics described above, if available, for example vote as to type of punishment.

In the case of reviewing exceptional behavior or skill, as shown in FIG. 5c, like with undesirable behavior, the arbitrating user's interface 1250 is presented with "game details," e.g., the results of the game, such as damage dealt and damage taken. In the case of League of Legends, also included is performance score, "gold earned," and "healing done" as examples. The user interface 1250 also identifies "report details," such as the player(s) who submitted reports related to the game-at-issue, the alleged reason for the report submission(s), such as selfless play and exceptional performance and other related statistics relevant to the allegations. If the reporting user also submits comments, such comments will also be displayed as well as the actual communications between players. Moreover, a "credibility grade" or score, such as the snitch score described above, may be associated and displayed with the reporting user. For example, if the reporting user indiscriminately submits a report for a high percentage of the games played, then a low credibility grade is provided, e.g., a "C." This may be stored and displayed in the reporting details for an arbitrating user to consider when voting. Moreover, the system 1000 may incorporate this statistic to reduce the "performance rating" for a particular user and/or reward issued.

From all of this data, the arbitrating user then has the option to either vote for issuing a reward, vote for no reward, skip vote, or end arbitration ("Done for now"). Other options include more "soft" votes, e.g., the arbitrating user can also vote as to whether such behavior or skill is indeed exceptional without rendering a reward vote. Moreover, the arbitrating user can also vote as to type of reward, e.g., whether to simply issue a complement, enable certain features, or issue grants of game play free of charge. To prevent users from abusing the arbitration system, the arbitrating server 1900 can also specify the amount of time allotted in between case files for review ("Time before next report"). Also included are the voting statistics ("46"). After a user submits a vote, the results are stored in a case file database 1920, which can be a relational database such as MySQL. These results can then enable an administrator and system 1000 to verify the "performance rating" in the report server system 1800 and issue certain rewards for the particularly exceptional players, such as issuing a certificate or adding special game play features exclusively for the players who exhibit exceptional skill or behavior The process for determining what reward to issue can optionally include relevant voting statistics described above, if available, for example vote as to type of reward.

Arbitrating users are generally more experienced users within the system 1000. The system 1000 can establish a qualification threshold (e.g., an objective skill level or game level) that a user would be required to achieve in order to connect to the arbitration server 1900 (in the case of League of Legends, an arbitrating user must be a "level 30 summoner"). Further, they can be rewarded for participating in the arbitration process, with increased levels, powers or features such as those described above, particularly if they consistently vote with the majority. However, preferably, there are parameters that are set to avoid abuse and potential conflicts of interest. For example, an arbitrating user would be precluded from obtaining a case file that they initiated via the report server system 1800 or that they are the subject of in such a report. Also, because different geographical regions and cultures may have different standards for what is considered to offensive (or exceptional) behavior, such arbitrating users may be organized accordingly. Moreover, if an arbitrating user consistently fails to vote with the majority, the credibility of the arbitrator's vote may be questioned. In such a case, such an arbitrating user's vote can be given less weight in calculating the harassment score for a particular offending user or performance ratings for a particular exceptional player.

In a preferred system 1000, these parameters are stored in the arbitration server database 1910 and can be modified by the administrator via the administrator client interface 2000. These parameters as well as others to assess punishment may include:

- disablement/enablement of the arbitration server system 1900;
- number of votes required for a case to be flagged for an administrator or system 1000 take action, such as punishment or rewards;
- the threshold (e.g. percent-based) for a case to be considered for punishment/rewards (e.g., 51% of votes for punishment/rewards would be required for actual punishment/rewards consideration);
- maximum "pool size" of cases that will be loaded into the queue evaluation by arbitrating users;
- threshold at which arbitration engine 1920 will fill in the queue case files for arbitrating users to review;
- interval at which the arbitration engine 1920 process will run (e.g., 5 mins.);
- interval at which arbitrating user must wait to vote when presented with a case file (e.g., 60 seconds) to ensure thorough review;
- identification of certain cases for the administrator to manually enter into the queue for arbitrating users to review;
- identification of cases that have reached verdict and require action such as punishment or exoneration or rewards;
- list of current cases awaiting verdict and voting statistics;
- voting and behavior history of users and arbitrating users;
- the number of allowed votes per day per user,
- region allocation for arbitrating users;
- qualifications for arbitrating users, e.g., certain level or number of games played;
- archived cases
- anti-collusion features that prevents arbitrating users from using the arbitration server 1900 to inappropriately gain awards.

Other data that can be stored in the database 1910 include:
- rewards issued to users;
- history of rewards program;
- punishment history of particular users;
- last punishment and decay (e.g., if a user has not been punished for a long time, that may indicate improved behavior;
- voting history of arbitrating users, including accuracy;
- voting history for particular cases, such as total votes, date voting started and date voting ended and verdict.

Preferred Processes

In the case of undesirable behavior, turning to FIG. 6, a reporting and arbitration process 3000 is shown in accordance with a preferred embodiment of the present invention to provide peer review. After the completion of a game, game data including recordings of game interactions and chat log are stored in the game files database 1510 of the game session server 1500 (Action Block 3010). If a second user witnesses undesirable behavior by one or more offending users, the second user can submit one or more reports to the report server system 1800 via its client interface 1100, such as that shown in FIG. 4b over the public network 1050 (Action Block 3020). If a third user wishes to arbitrate case files (Decision Block 3030), then the third user ("arbitrating user") can make a request via an arbitration client 1200 over the public network 1050 to the arbitration server system 1900. In response, the arbitration engine 1920 will create a case or arbitration file by querying a report from the report server system 1800 (Action Block 3040). Determining which report will be queried may depend on a variety of factors and/or algorithms. For example, the report queried may be random or prioritized based on type of undesirable behavior reported and/or harassment score of a particular user (e.g., top offender).

Once a report is returned to the arbitration server system 1900, the arbitration engine 1920 will identify the game and user associated with that report ("game ID" and "user ID", respectively). The arbitration engine 1920 will use the game ID to query the game data associated with that game from the statistics server system 1700 database 1710 (Action Block 3050), including game details and chat data. This data will be merged with the report and transmitted to the third user's arbitration client 1200 as a case file (Action Block 3060). The User ID may further be used to obtain game data associated with that allegedly offending user from other games within the statistics server system 1700 database 1710. If the arbitrating user submits a vote (Decision Block 3070), then the arbitration system 1900 assesses whether a vote threshold has been met (Decision Block 3080). For instance, an assessment is made as to whether a certain minimum number of votes have been cast and whether the majority ruled in favor of punishment (or exoneration). For example, if a certain percentage of votes (e.g., 51%) for punishment are received for a particular case file that received a certain number of total votes (e.g., 100), then appropriate action may be taken (Action Block 3090), e.g., automatic punishment by the arbitration server 1900. Generally, punishment can be issued manually by the system's 1000 administrator or automatically by the system 1000 itself, e.g., via the arbitration server 1900. For example, the arbitration server 1900 can issue a warning or notification (e.g., via email) or disable temporary or permanent access to the system 1000 or disable or reduce power levels and features. Moreover, the arbitration server 1900 can notify the offending user of the reports submitted, vote status, and ultimate punishment if any. Subsequently, the vote data is then stored with the report in the report server database 1810 and/or arbitration server database 1910 (Action Block 3100) for review and action by the administrator and/or system 1000.

For exceptional and desirable behavior or skill, turning to FIG. 7, a reporting and arbitration process 4000 to enable peer review is shown in accordance with a preferred embodiment of the present invention. After the completion of a game, game data including recordings of game interactions and chat log are stored in the game files database 1510 of the game session server 1500 (Action Block 4010). If a second user witnesses exceptional skill or positive behavior by one or more users, the second user can submit a report to the report server system 1800 via its client interface 1150, such as that shown in FIG. 4c over the public network 1050 to provide positive feedback (Action Block 4020). If a third user wishes to review a positive behavior or skill case files (Decision Block 4030), then the third user ("arbitrating user") can make a request via an arbitration client 1250 over the public network 1050 to the arbitration server system 1900. In response, the arbitration engine 1920 will create a case or arbitration file by querying a report from the report server system 1800 (Action Block 4040). Determining which report will be queried may depend on a variety of factors and/or algorithms. For example, the report queried may be random or prioritized based on type of desirable and/or positive behavior or skill reported and/or performance score of a particular user (e.g., top performer).

Once a report is returned to the arbitration server system 1900, the arbitration engine 1920 will identify the game and user associated with that report ("game ID" and "user ID", respectively). The arbitration engine 1920 will use the game ID to query the game data associated with that game from the statistics server system 1700 database 1710 (Action Block 4050), including game details and chat data. This data will be merged with the report and transmitted to the third user's arbitration client 1200 as a case file (Action Block 4060). The User ID may further be used to obtain game data associated with that exceptional user from other games within the statistics server system 1700 database 1710. If the arbitrating user submits a vote (Decision Block 4070), then the arbitration system 1900 assesses whether a vote threshold has been met (Decision Block 4080). For instance, an assessment is made as to whether a certain minimum number of votes have been cast and whether the majority ruled in favor of reward. For example, if a certain percentage of votes (e.g., 51%) for rewards are received for a particular case file that received a certain number of total votes (e.g., 100), then appropriate action may be taken (Action Block 4090), e.g., automatic issuance of rewards by the arbitration server 1900. Generally, rewards can be issued manually by the system's 1000 administrator or automatically by the system 1000 itself, e.g., via the arbitration server 1900. For example, the arbitration server 1900 can issue a notification (e.g., via email) or increase power levels and features. Moreover, the arbitration server 1900 can notify the exceptional user of the reports submitted, vote status, and ultimate reward if any to provide that positive feedback that encourages continued positive behavior and experience. Subsequently, the vote data is then stored with the report in the report server database 1810 and/or arbitration server database 1910 (Action Block 4100) for review and action by the administrator and/or system 1000. These processes effectively enable the game system 1000 to leverage participation by the system's 1000 users to discourage undesirable behavior and encourage exceptional behavior and game play to ensure a desirable experience for the rest of the users.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for interpersonal relationships; however, the invention can be used for any relationship in general. Additionally and obviously, features may be added or subtracted as desired. Accordingly, the invention is not to be restricted except in light of the attached claims and their equivalents.

What is claimed is:

1. A computer implemented method for monitoring behaviors of multiple users playing a particular game, wherein the particular game is a massively multiplayer online game in a virtual world on a computer network through an online game system comprising a report server system and an arbitration server system communicably and remotely connected to the report server system, the online game system including instructions stored in non-transitory computer readable memory that, when executed by a processor, perform steps comprising:

recording each user's interaction with the online game system, including messages exchanged between users through the online game system and storing said recordings in a game file database in non-transitory computer readable memory of an online game server;

after receiving at the report server system, via the network, at least one report submitted by a first user to submit at least one report for at least one second user that indicates that the at least one second user displayed certain behavior during the at least one second user's interaction with the online game system during the particular game, sending the first user's at least one report with the recordings for the particular game to the arbitration server system via the network for presentation and review by at least one arbitrating user for presentation and review on a user interface of a user device; and receiving at the arbitration server system, via the network, a vote related to confirming the first user's at least one report submitted by the at least one arbitrating user after review and storing the vote in non-transitory computer readable memory, wherein the at least one report includes data that indicates a ratio of how many reports the first user has submitted compared to how many games the first user has played.

2. The computer implemented method of claim 1, wherein the at least one report alleges that the at least one second user exhibited undesirable behavior during the at least one second user's interaction with the game system during said particular game.

3. The computer implemented method of claim 2, further comprising wherein the submitted vote indicates whether to punish or exonerate the at least one second user.

4. The computer implemented method of claim 2, further comprising:
   assessing whether a punishment vote threshold for the at least one second user has been reached; and
   disabling the at least one second user's access to the game system if the punishment vote threshold has been reached.

5. The computer implemented method of claim 4, wherein assessing whether the punishment vote threshold has been reached further comprises:
   calculating a total number of votes received after review;
   calculating a percentage of received votes that are in favor of punishment; and
   comparing the percentage of received votes in favor of punishment to a preset minimum percentage level required for punishment.

6. The computer implemented method of claim 1, wherein the at least one report alleges that the at least one second user exhibited desirable behavior or skill during the at least one second user's interaction with the game system during said particular game.

7. The computer implemented method of claim 6, wherein the submitted vote indicates whether to reward the at least one second user.

8. The computer implemented method of claim 1, wherein the at least one second user's vote count is reduced if no other reports are submitted for that at least one second user during a predetermined period of time after the first user's report is submitted.

9. The computer implemented method of claim 1, further comprising:
   based on the stored a voting history for each of the at least one arbitrating user that submitted votes, issuing online rewards to the at least one arbitrating user if the at least one arbitrating user votes with a certain level of accuracy.

10. The computer implemented method of claim 1, wherein the particular games of online game system are session-based.

* * * * *